United States Patent
Park

(10) Patent No.: US 11,200,225 B2
(45) Date of Patent: Dec. 14, 2021

(54) METHOD AND BLOCKCHAIN FOR CONSTRUCTING SUB BLOCKCHAIN IN BLOCKCHAIN SYSTEM COMPRISING DISTRIBUTED NETWORK OF PLURALITY OF NODES

(71) Applicant: NHN Corporation, Gyeonggi-do (KR)

(72) Inventor: Paul Park, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 192 days.

(21) Appl. No.: 16/684,598

(22) Filed: Nov. 15, 2019

(65) Prior Publication Data

US 2020/0159717 A1 May 21, 2020

(30) Foreign Application Priority Data

Nov. 15, 2018 (KR) .......................... 10-2018-0140422

(51) Int. Cl.
| | |
|---|---|
| *G06F 16/00* | (2019.01) |
| *G06F 16/23* | (2019.01) |
| *G06F 16/28* | (2019.01) |
| *G06F 16/248* | (2019.01) |
| *G06Q 20/38* | (2012.01) |
| *H04L 9/06* | (2006.01) |

(52) U.S. Cl.
CPC ........ *G06F 16/2365* (2019.01); *G06F 16/248* (2019.01); *G06F 16/28* (2019.01); *G06Q 20/389* (2013.01); *H04L 9/0643* (2013.01)

(58) Field of Classification Search
CPC .... G06F 16/2365; G06F 16/28; G06Q 20/065
See application file for complete search history.

(56) References Cited

U.S. PATENT DOCUMENTS

| | | | |
|---|---|---|---|
| 2018/0121909 A1* | 5/2018 | Christidis | ............. H04L 9/3236 |
| 2020/0145221 A1* | 5/2020 | Chao | ..................... H04L 9/3247 |

FOREIGN PATENT DOCUMENTS

KR 10-2018-0115779 10/2018

OTHER PUBLICATIONS

Tong et al., "A Hierarchical Sharding Protocol for Multi-domain IoT Blockchains", IEEE, pp. 1-6, 2019. (Year: 2019).*

(Continued)

*Primary Examiner* — Cheryl Lewis
(74) *Attorney, Agent, or Firm* — Ladas & Parry, LLP

(57) ABSTRACT

A method for constructing a sub-blockchain in a blockchain system comprising a distributed network of nodes comprises generating and propagating, by one of the nodes, a candidate sub-block comprised in a sub-blockchain to be connected to one of main blocks included in a main blockchain; validating the candidate sub-block and storing and propagating the validated candidate sub-block by one of the nodes; validating a content block received from a node which generated the candidate sub-block corresponding to content queried by a user and storing and propagating an end block connected to the content block by one of the nodes; and if the number of the same end blocks received from other nodes is larger than a preconfigured value, generating an approved sub-block, and propagating the approved sub-block by one of the nodes while updating the approved sub-block to a local copy of a blockchain.

20 Claims, 11 Drawing Sheets

(56) References Cited

OTHER PUBLICATIONS

Wan et al., "Evaluating The Impact of Network Latency on The Safety of Blockchain Transactions", 2019 IEEE International Conference on Blockchain, pp. 194-201. (Year: 2019).*
Kushch et al., "Blockchain for Dynamic Nodes in a Smart City", 2019 IEEE 5th World Forum on Internet of Things (WF-IoT), pp. 19-24. (Year: 2019).*
Satoshi Nakamoto; "Bitcoin: A Peer-to-Peer Electronic Cash System", May 24, 2009, pp. 1-9.

* cited by examiner

METHOD AND BLOCKCHAIN FOR CONSTRUCTING SUB BLOCKCHAIN IN BLOCKCHAIN SYSTEM COMPRISING DISTRIBUTED NETWORK OF PLURALITY OF NODES

CROSS REFERENCE TO RELATED APPLICATION(S)

This application claims the priority to Korean Patent Application No. 10-2018-0140422, filed on Nov. 15, 2018, which is all hereby incorporated by reference in its entirety.

BACKGROUND

Technical Field

The present disclosure generally relates to a blockchain and more particularly, a method for constructing a sub-blockchain in a blockchain system comprising a distributed network of a plurality of nodes and a blockchain system for performing the method.

Related Art

Satoshi Nagamoto introduced the blockchain concept in 2008 as a method for connecting blocks in his article titled "Bitcoin: A Peer-to-Peer Electronic Cash System". A blockchain may be used as a ledger shared among peers. Content of a block is transparent and open to the public but is resistant to arbitrary modification, which makes a blockchain as an indispensable technology in the cryptocurrency. Nowadays, the blockchain technology is regarded as applicable not only to the cryptocurrency but also to various industrial fields. The blockchain is based on a distributed P2P network. P2P stands for Peer-to-Peer and refers to a network in which individual terminals communicate with each other as equally privileged participants without involving a central server. Each terminal can act as both/either a server and/or a client. Each node (peer) participating in a blockchain network keeps a copy of the ledger and determines its behavior based on the content of the ledger kept in the node. In other words, each node determines whether to accept a block, whether to generate a next block, or whether to propagate the accepted block to its neighboring nodes. Each node may be an independent entity and may not require reliability of other nodes connected to itself. A block on a conventional blockchain is allowed to contain a limited amount of data. Due to the inherent characteristics of the blockchain technology, in which a large number of nodes participating in a network store blocks in a distributed manner, a certain limitation is inevitably imposed on the size of data to be included in a block.

It is with respect to these and other general considerations that the following embodiments have been described. Also, although relatively specific problems have been discussed, it should be understood that the embodiments should not be limited to solving the specific problems identified in the background.

PRIOR ART REFERENCES

Patents (Patent 001) Korean Patent Application Publication No. 10-2018-0115779

SUMMARY

To solve the problem above, various embodiments of the present disclosure may provide a method for overcoming a limitation to the size of data to be included on a blockchain and a blockchain system for performing the method.

Some embodiments of the present disclosure may provide a method for constructing a sub-blockchain including content and a blockchain system for performing the method.

Certain embodiments of the present disclosure may provide a method for selectively synchronizing a content block having a large capacity and a blockchain system for performing the method.

Some embodiments of the present disclosure may provide an agreement algorithm for accepting a sub-blockchain.

According to an embodiment of the present disclosure, a method for constructing a sub-blockchain in a blockchain system comprising a distributed network of a plurality of nodes may comprise generating and propagating, by one of a plurality of nodes, a candidate sub-block comprising a sub-blockchain to be connected dependently to one of a plurality of main blocks within a main block chain; validating a received candidate sub-block and storing and propagating the validated candidate sub-block by one of a plurality of nodes; validating a content block received from a node which has generated a candidate sub-block matched to the content queried by a user and storing and propagating an end block connected to the content block by one of a plurality of nodes; and if the number of the same end blocks received is larger than a preconfigured value, generating an approved sub-block by approving a candidate sub-block connected to the end block, and propagating the granted sub-block by one of a plurality of nodes while updating the approved sub-block on a pre-stored local copy of a blockchain.

According to a different aspect, the method may further comprise approving the sub-blockchain consisting of the content block connected to the approved sub-block and the end block connected to the content block and connecting the approved sub-blockchain to the main blockchain.

According to a different aspect of the method, one of the plurality of nodes may selectively store only a specific block of a plurality of blocks comprising an approved sub-blockchain.

According to a different aspect of the method, each of the plurality of main blocks may include item information for each predetermined category, and content included in the sub-blockchain may be matched to item information for each category of a main block connected to the sub-blockchain.

According to a different aspect of the method, the sub-blockchain may be connected dependently to another sub-blockchain connected dependently to one of a plurality of main blocks within a main blockchain.

According to a different aspect of the method, the generating and propagating a candidate sub-block may include generating an end block; generating a content block including a hash and content of the end block; generating a candidate sub-block including a hash of the content block and a hash of a main block matched to the category of the content; and propagating the candidate sub-block to a blockchain network.

According to a different aspect of the method, the validating a content block received from a node which has generated a candidate sub-block matched to the content queried by a user and storing and propagating an end block connected to the content block by one of a plurality of nodes may include receiving content information to be retrieved from a user; searching stored candidate sub-blocks for a sub-block matched to received content information; requesting a node which has generated a searched sub-block to transmit a content block connected to the searched sub-block; validating a received content block; and receiving an end block and storing the end block into a node which has generated the search sub-block connected to a validated content block and propagating the end block to the blockchain network.

According to a different aspect of the method, the generating a content block including a hash and content of an end block may include generating a plurality of content blocks being connected dependently to each other and including hashes of subsequent content blocks connected dependently to the plurality of content blocks, wherein the last content block of the plurality of content blocks includes a hash of the end block, and a candidate sub-block including a hash of the forefront content block of the plurality of content blocks and a hash of a main block matched to the category of the content is generated.

According to a different aspect of the method, the last content block may include the content, and the remaining content blocks except for the last content block may include summary information of the content.

According to a different aspect of the method, each of the plurality of content blocks may include content segment obtained by dividing the content into a plurality of content segments.

According to a different aspect of the method, the validating a content block received from a node which has generated a candidate sub-block matched to the content queried by a user and storing and propagating an end block connected to the content block by one of a plurality of nodes may include receiving content information to be retrieved from a user; searching stored candidate sub-blocks for a sub-block matched to received content information; requesting a node which has generated a searched sub-block to transmit the plurality of content blocks connected to the searched sub-block and validating each of a plurality of received content blocks; and if validation of the last content block of the plurality of content blocks is completed, receiving an end block and storing the end block into a node which has generated the search sub-block and propagating the end block to the blockchain network.

According to a different aspect of the method, the generating a content block including a hash and content of an end block may include generating an end block; generating the original content block including a hash and content of the end block and a duplicate content block including a hash of the end block; generating a candidate sub-block including hashes of the original and duplicate content blocks and a hash of a main block matched to the category of the content; and propagating the candidate sub-block to a blockchain network.

According to a different aspect of the method, the duplicate content block may include either a script for requesting transmission of the original content block or link information about a storage in which the original content block including the content is stored.

According to a different aspect, a computer-readable non-volatile medium recording a computer program including commands executable by at least one processor of at least one node of a blockchain system comprising a distributed network of a plurality of nodes may be provided, wherein the commands may display a main blockchain the blocks of which are connected dependently to each other and include a plurality of individual pieces of category information in response to a user request; display sub-blocks of each of at least one sub-blockchain connected to the main block in response to selection of one main block on the main block chain; request a content storage node to transmit the plurality of content blocks in response to selection of one of the sub-blocks, the content storage node storing a plurality of content blocks connected dependently to the sub-block; and display content within a received content block.

According to a different aspect of the computer-readable non-volatile medium recording a computer program, after validation of a received content block among the plurality of content blocks is completed, transmission of a content block connected subsequently to the received content block may be requested.

According to a different aspect of the computer-readable non-volatile medium recording a computer program, if display of content within the received content block is completed, validation of the received content block may be determined as being completed.

According to a different aspect of the computer-readable non-volatile medium recording a computer program, in response to receiving information about validity of displayed content, validation of the displayed content may be determined as being completed.

According to a different aspect of the computer-readable non-volatile medium recording a computer program, the plurality of content nodes may be connected dependently to each other, and the remaining content nodes except for the last content node of the plurality of content nodes may include summary information of the content included in the last content node.

According to a different aspect of the computer-readable non-volatile medium recording a computer program, if validation of the plurality of content blocks is completed, an end block connected to the last content node of the plurality of content nodes may be received from the content storage node, and the received end block is propagated to another node.

According to a different aspect of the computer-readable non-volatile medium recording a computer program, the plurality of nodes may share information about the number of retrievals of content within the content block, and when the sub-blocks are displayed, reliability information of content computed based on the information about the number of retrievals may be further displayed.

This summary is provided to introduce a selection of concepts in a simplified form that are further described below in the Detailed Description. This summary is not intended to identify key features or essential features of the claimed subject matter, nor is it included to be used to limit the scope of the claimed subject matter.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, the terms such as first and second are introduced to distinguish one element from the others, and thus the technical scope of the present disclosure should not be limited by those terms. Also, a singular expression should be understood to indicate a plural expression unless otherwise explicitly stated. The term "include" or "have" is used to indicate existence of an embodied feature or constituting element in the present specification; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the specification, the same or corresponding constituting element is assigned the same reference number, and repeated descriptions thereof will be omitted.

Figure 1:
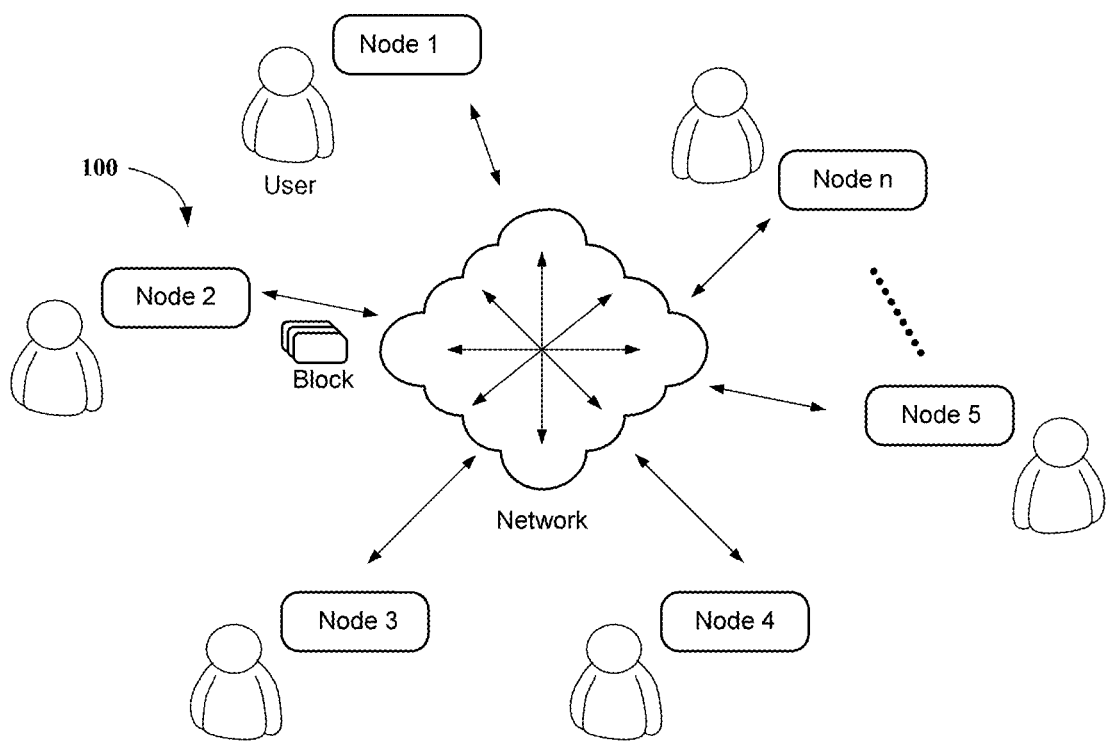
FIG. 1 illustrates a blockchain system comprising a distributed network of a plurality of nodes according to an embodiment of the present disclosure.

FIG. 1 illustrates a blockchain system comprising a distributed network of a plurality of nodes according to an embodiment of the present disclosure.

A system 10 may be built on a peer-to-peer network architecture. For example, users participating in the system 10 are all equally privileged, no special node is designated in the network, and all of the nodes share the role of providing a network service. Various nodes on the network form topologies equivalent to each other and are interconnected in a mesh network. Even if nodes belonging to the network are at the same level of privilege, their role may differ from each other depending on their supporting function.

Each node is equipped with a routing function within the network and may also perform other function(s). Each node may validate and propagate various data including transactions and blocks and perform the role of maintaining a connection to neighboring nodes. Here, the transaction refers not only to a financial transaction or transaction of virtual currency but also various transactions associated with a smart contract. Therefore, it should be noted that the transaction as indicated in the present disclosure is not limited to a specific transaction.

The users may include various types of entities ranging from ordinary individuals, organizations, communities, up to massive groups.

To participate in the system 10, a new node may first search for other nodes existing on or connected to the network. To start this process, a new node may search for at least one node already present on or connected to the network and connect itself to the searched node. For the new node to be connected to a neighboring node already known, each of the nodes may form a Transmission Control Protocol (TCP) connection to a port of a particular number or to an alternative port. The new node may transmit a connection request message to a neighboring node, and the neighboring node may respond to the connection request message by transmitting a grant message to the new node if the neighboring node grants the connection request. After one or more connections have been established, the new node may transmit an address message containing its IP address to its neighboring nodes. Subsequently, the neighboring nodes transmit the received address message to their neighboring nodes, and thereby the newly connected node becomes better known and better connected to other nodes in the network. Also, the newly connected node may request one or more of its neighboring nodes to transmit a list of IP addresses of the other neighboring nodes by transmitting an address request message to its neighboring nodes. Through the aforementioned operation, a node may search for its neighboring nodes connected thereto and broadcast its presence on the network so that other nodes may search for the node itself.

At least part of a plurality of nodes 100 may have a copy of the whole blockchain or a copy corresponding to a subset of the blockchain. In some embodiments, at least part of a plurality of nodes 100 may have a copy of the whole main blockchain of a blockchain, a copy of the whole sub-blockchain or a copy corresponding to a subset of the sub-blockchain.

A blockchain is realized by the distributed computer system 10 comprising unalterable blocks containing various types of data. Each block constituting a blockchain contains a hash of its previous block, and therefore blocks are connected altogether and generate records about information such as categories initially written to the blockchain. Since a block is tied or connected to previous blocks, disassembly, modification, and reconfiguration of the records may be almost impossible. And, because blocks are possessed by nodes, the blocks can be distributed and robust.

Each node may include, for example, but not limited to, a server, interface, system, database, agent, peer, engine, controller, or any other type of a computing device operating individually or in a group or may be constructed in an appropriate combination of computing devices so as to read all kinds of computing languages or instructions. The computing device may include a processor configured to execute software commands or instructions stored in a non-volatile computer-readable storage medium (for example, a hard drive, solid state drive, RAM, flash, and ROM). Preferably, software commands or instructions are organized so that a computing device may provide various functions described later. Also, the disclosed techniques may be implemented as a computer program product which includes a non-volatile computer-readable medium storing software commands used by the processor to execute disclosed steps. Preferably, various servers, systems, databases, and interfaces may exchange data by using HTTP, HTTPS, AES, public/private key exchange, web service, API, financial transaction protocol known to the public, or other electronic standard protocol or algorithm. Preferably, data exchange may be performed through a packet exchange network, Internet, LAN, WAN, VPN, or other type of packet exchange network.

Figure 2:
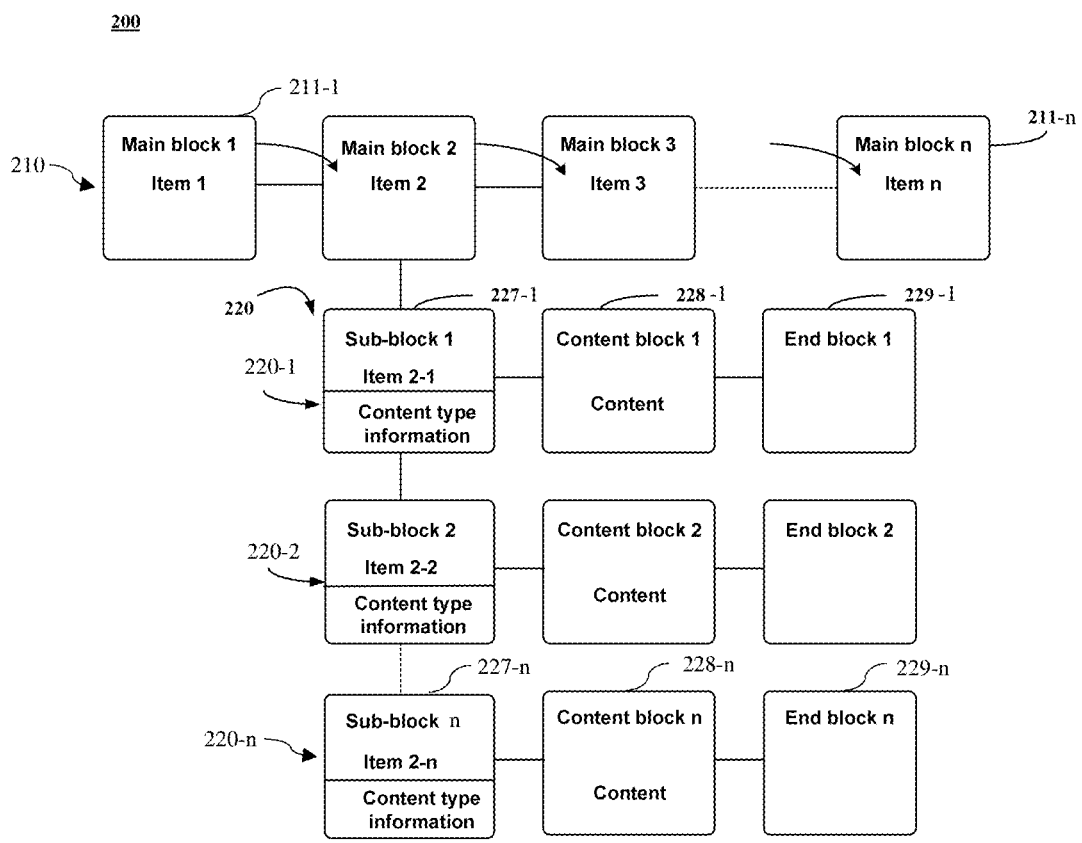
FIG. 2 illustrates a blockchain which is shared by a plurality of nodes according to an embodiment of the present disclosure.

FIG. 2 illustrates a blockchain which is shared by a plurality of nodes according to an embodiment of the present disclosure.

A blockchain 200 may comprise a main blockchain 210 and a sub-blockchain 220. In the embodiment of FIG. 2, the sub-blockchain 220 is connected to a main block 2, but the embodiment shown in FIG. 2 is only an example for the purpose of illustration. Alternatively, the sub-blockchain 220 may be connected to at least one of other main blocks (e.g. main blocks 1, 3, 4, . . . , n).

The main blockchain 210 may comprise a plurality of main blocks 211-1 to 211-$n$. The plurality of main blocks 211-1 to 211-$n$ are dependently connected to each other. Each main block may include a hash of a previous main block. Each of the main blocks 211-1 to 211-$n$ may include item information for each predetermined category. Here, categories are used to distinguish content of the same kind or group according to the respective specific items. For example, in case content is a movie, the content may be classified into categories such as Korean movies, U.S. movies, Hong Kong movies, Chinese moves, Japanese movies, and so on. However, it should be noted that content is not limited only to movies. Some main blocks of a plurality of main blocks 211 may have only one item information among a plurality of items, and the item information contained in each of the plurality of main blocks may be different from each other.

The sub-blockchain 220 may be another chain connected to one main block of the plurality of main blocks 211-1 to 211-$n$ or another chain connected to another sub-blockchain 220. For example, a first sub-blockchain 220-1 may be a sub-blockchain connected to one of the main blocks 211-1 to 211-$n$, and a second sub-blockchain 220-2 may be a sub-blockchain connected to the first sub-blockchain 220-1. One or some sub-blocks included in the sub-blockchain 220 may contain content.

For example, the first and second sub-blockchains 220-1, 220-2 connected to one main block may include content classified into the same category, but include different types of content.

Each sub-blockchain 220 may include a sub-block 227, a content block 228, and an end block 229.

The end block 229 may be a block indicating the last block of one sub-blockchain. The end block 229 may include sub-block identification information for identifying a sub-block to which the end block itself is connected.

The content block 228 may include a hash of the end block 229 and sub-block identification information for identifying a sub-block to which the content block itself is connected. Also, the content block 228 may include content. For instance, the content may refer to digital information that users participating in the network want to share, sell, or purchase, which may indicate digitally processed content of various types of information, program, movie, music, game software, and so on.

The sub-block 227-$n$ may include a hash of the content block 228-$n$ and a hash of a main block to which the sub-block 227-$n$ is connected. Also, the sub-block 227-$n$ may include information about the type of content.

A plurality of nodes participating in the network may have a local copy of the main blockchain 210. Information recorded in the main block 211-$n$ within the main blockchain 210 is category information, which is not large in data size. Therefore, blockchain synchronization needed for a node participating in the network to store a local copy of the main blockchain 210 may be performed quickly.

The length of the main blockchain 210 may be extended. In other words, a new main block may be continuously updated on or added to the main blockchain 210. One designated node among nodes participating in the network may manage the main blockchain 210. In other words, the designated node may connect a new main block on the main blockchain 210.

Figure 3:
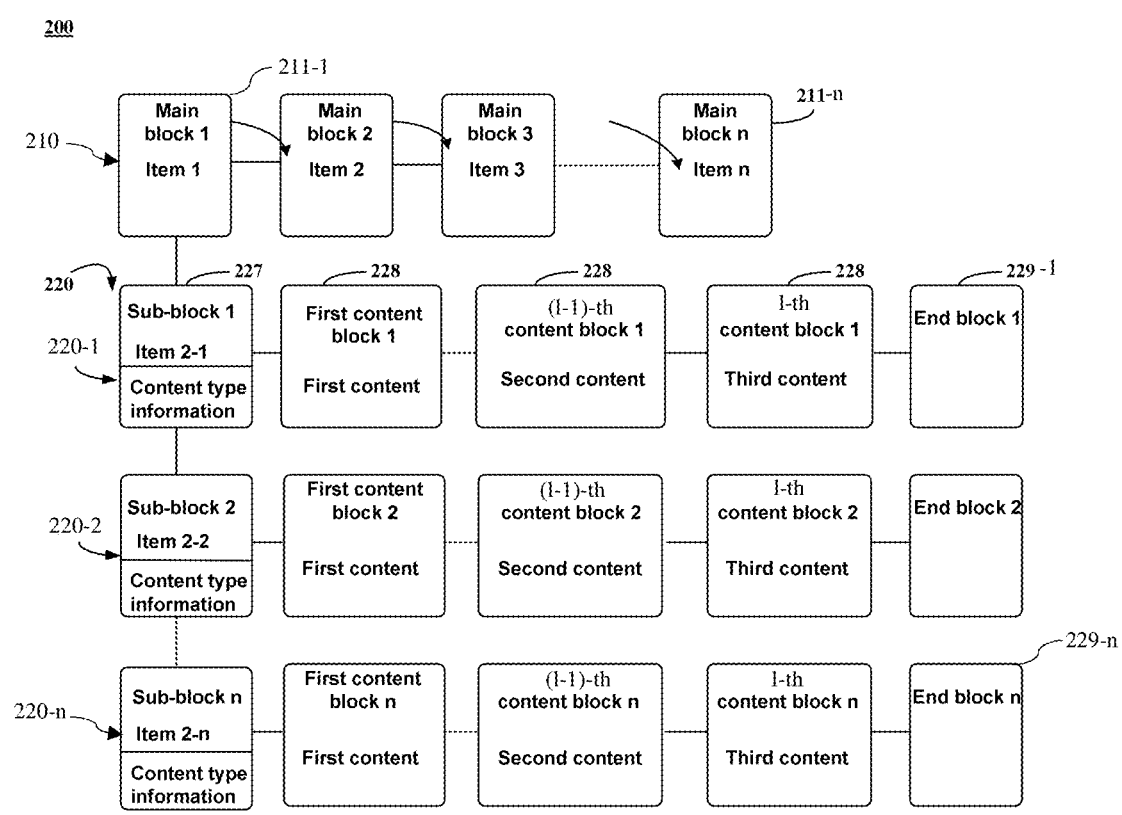
FIG. 3 illustrates a blockchain which is shared by a plurality of nodes according to another embodiment of the present disclosure.

FIG. 3 illustrates a blockchain which is shared by a plurality of nodes according to another embodiment of the present disclosure.

A sub-blockchain 220-$n$ may comprise a sub-block 227-$n$, a plurality of content blocks 228-$n$, and an end block 229-$n$.

For example, the plurality of content blocks 228 may include first to l-th content blocks (where n is an integer larger than one).

The l-th content block 228-$n$ may include a hash of the end block 229-$n$ and information of a sub-block to which the l-th content block 228-$n$ is connected. The l-th content block may include content. The first content block may include a hash of the second content block. In other words, the (n−m)-th content block (where m is larger than or equal to 1 and less than or equal to (n−1)) may include a hash of the (n−m+1)-th content block. An arbitrary content block may include hash values of the content block itself and a subsequent content block dependently connected thereto. And, the content block in the last stage or order among the plurality of content blocks may include a hash of the end block, and the hash of the forefront content block may be included in a candidate sub-block.

Each of the first to the (l−1)-th content blocks may include summary information about content included in the nith content block. In some embodiments, each of the first to the (l−1)-th content blocks may include different summary information about the content included in the n-th content block. In other words, each of the first to the (l−1)-th content blocks may include only the content summary information which is smaller than the size of content included in the l-th content block. For example, in case the content is a movie, the first content block may include title information of the movie while the second content block may include credit information of content, and the third content block may include part of the content. In another example, in case the content is a movie, the first content block may include title information of the movie, and the second content block may include a release data of the movie, producer information, actor information, running time information, and so on. And, the third content block may include photo information of the movie or a trailer of the movie. However, the present disclosure is not limited to the specific example, depending on the number of content blocks, except for the last content block including the content, information included in the remaining content blocks may be different.

In some embodiments, each of the first to the l-th content blocks may include portions of one content. For example, one content may be divided intol portions, and each of the divided content may be included in the first to the l-th content blocks. In case the content is a movie, video segments divided in a temporal order may be included sequentially in the first to the l-th content blocks.

Figure 4:
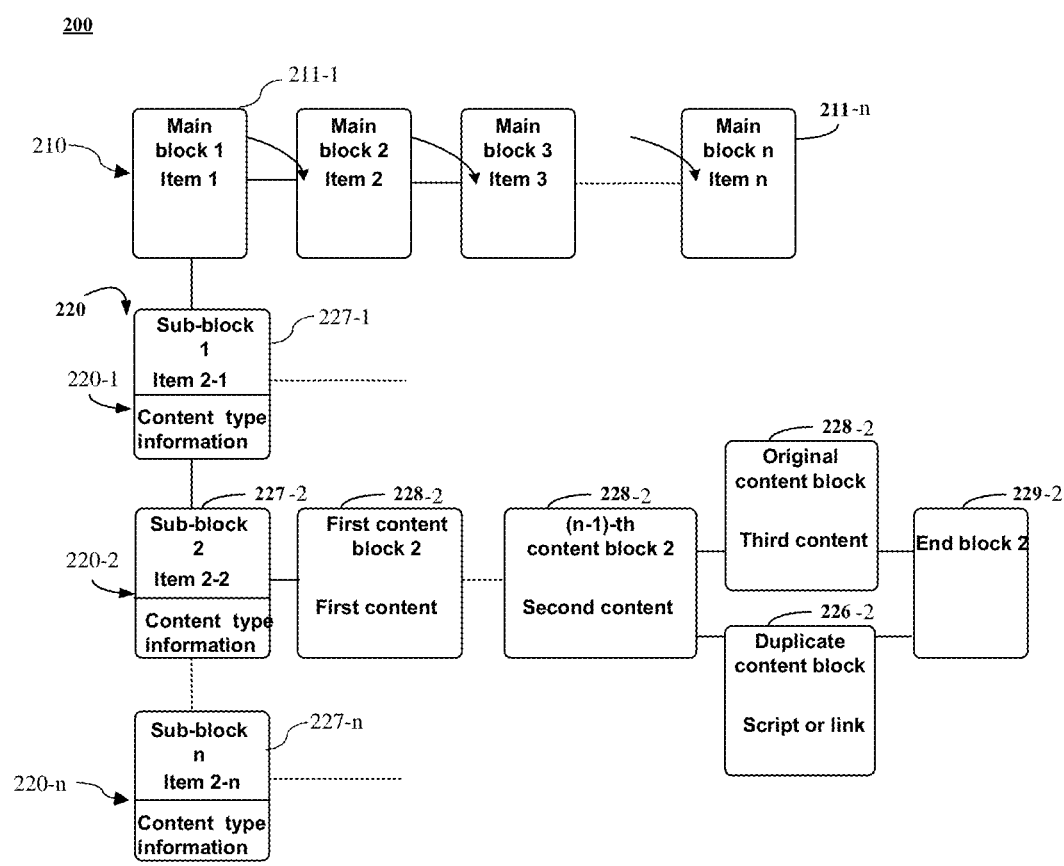
FIG. 4 illustrates a blockchain which is shared by a plurality of nodes according to yet another embodiment of the present disclosure.

FIG. 4 illustrates a blockchain the whole or part of which is shared by a plurality of nodes according to yet another embodiment of the present disclosure.

A sub-blockchain 220-n may include a sub-block 227-n, an original content block 228-n, a duplicate content block 226-n, and an end block 229-n.

Each of the original content block 228-n and the duplicate content block 226-n may include a hash of the end block 229-n. And, the sub-block 227-n may include a hash of the original content block 228-n and a hash of the duplicate content block 226-n.

The original content block 228-n is a block that includes content while the duplicate content block 226-n is a block that does not include the content. And, the duplicate content block 226-n may embed in a script for requesting transmission of the original content block 228-n to a node having the original content block 228-n. If the node executes the script within the duplicate content block 226-n, the script requests the node having the original content block 228-n to transmit the original content block 288-n. In another example, the duplicate content block 226-n may include link information about a storage in which the original content is stored. The node requests the original content block 228-n from a node connected to a link within the content block 226-n.

A node storing the sub-blockchain 220 may store all of the sub-block 227, the original content block 228, the duplicate content block 226, and the end block 229. Among them above, the original content block 288 may not be stored selectively.

In some embodiments, a content block may include a plural number of content blocks. For example, the content block may comprise the first to the (n−1)-th content blocks, the n-th content block which is the original content block, and a duplicate content block. The (n−1)-th content block may include hash values of the n-th content block and the duplicate content block. In another embodiment, in case one content is divided and the divided portions of the content are stored in a plurality of content blocks respectively, content blocks may comprise the first to the n-th original content blocks and the first to the n-th duplicate content blocks. The m-th original content block (where m is an integer larger than 1 and less than n) and the m-th duplicate content block may include hash values of the (m+1)-th original content block and the (m+1)-th duplicate content block.

Figure 5:
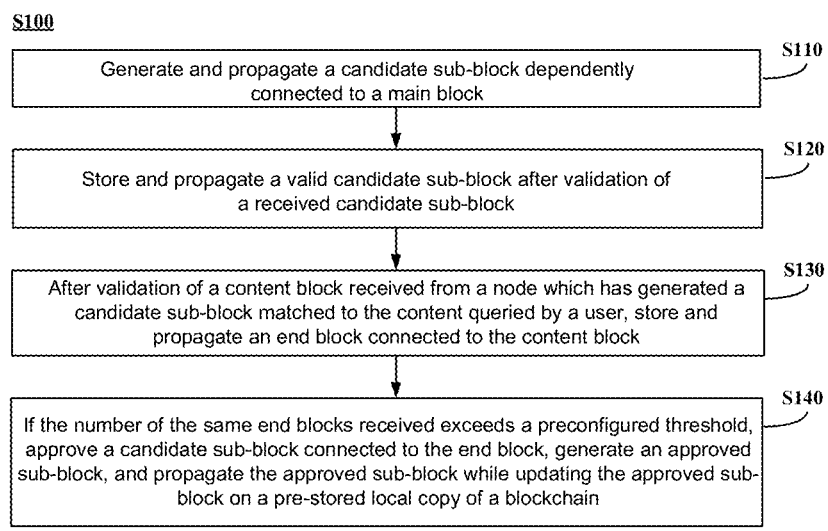
FIG. 5 is a flow diagram illustrating a method for constructing a sub-blockchain in a blockchain system comprising a distributed network of a plurality of nodes according to an embodiment of the present disclosure.

FIG. 5 is a flow diagram illustrating a method for constructing a sub-blockchain in a blockchain system comprising a distributed network of a plurality of nodes according to an embodiment of the present disclosure.

Referring to FIG. 5, a method S100 may construct a sub-blockchain in a blockchain system comprising a distributed network of a plurality of nodes. The method S100 may include generating and propagating, by one of a plurality of nodes, a candidate sub-block connected dependently to a main block chain (S110), validating a received candidate sub-block and storing and propagating a validated candidate sub-block by one of a plurality of nodes (S120), receiving a content block from a node which has generated a candidate sub-block matched to the content queried by a user, validating the received content block, and storing and propagating an end block connected to the content block by one of a plurality of nodes (S130), and if the number of the same end blocks received from another node is larger than a preconfigured value, generating a granted sub-block by granting a candidate sub-block connected to the end block, updating the granted sub-block in a local copy of a pre-stored blockchain, and propagating the granted sub-block by one of a plurality of nodes (S140).

In what follows, each step of FIG. 5 will be described in more detail.

Figure 6:
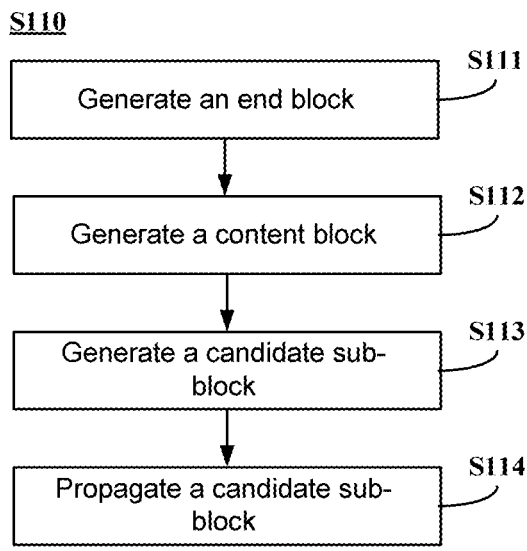
FIG. 6 is a flow diagram illustrating a method for generating a candidate sub-block in a node according to an embodiment of the present disclosure.

FIG. 6 is a flow diagram illustrating a method for generating a candidate sub-block in a node according to an embodiment of the present disclosure.

Referring to FIGS. 5 and 6, the step or operation S110 for generating a candidate sub-block in an arbitrary node and propagating the candidate sub-block which may include generating an end block (S111), generating a content block including a hash of the end block and content (S112), generating a candidate sub-block including a hash of the content block and a hash of a main block matched to or corresponding to the category of the content (S113), and propagating the candidate sub-block to a blockchain network (S114).

All of the nodes participating in the blockchain network may have a right for generating a candidate sub-block. Alternatively, one or some of the nodes are allowed to generate a candidate sub-block.

A node may generate a candidate sub-block to validate and share its content on a blockchain system.

A node may generate an end block (S111). The end block is a block comprised in a sub-blockchain and is the last block of the sub-blockchain. The end block may include one or more of information of a node generating the end block, creation time, content information, information for identifying a candidate sub-block, and so on.

The node may generate a content block including a hash of the end block and content (S112). The content included in the content block may be the content matched to the category information included in a main block connected to the sub-blockchain. For example, in case the category information included in the main block is Korean movies, content in the content block may be movie content classified as a Korean movie.

The node may generate a candidate sub-block including a hash of the content block and a hash of the main block (S113). The candidate sub-block, including a hash of the content block, may be connected to the content block. And, the candidate sub-block may include a hash of the main block to which a sub-blockchain of the candidate sub-block is connected.

In some embodiments, in the case of existence of a plurality of content blocks dependently connected to each other, the candidate sub-block may include a hash of the forefront content block among the plurality of content blocks.

In another embodiment, in case an already granted sub-block is connected to the main block, a candidate sub-block including a hash of the main block and a hash of the already granted sub-block may be generated.

If a sub-blockchain is constructed, the node may propagate the candidate sub-block of the sub-blockchain on the blockchain network (S114). The node propagates only the candidate sub-block, not the whole sub-blockchain. Because only the identification information of content rather than the content itself is included in the candidate sub-block, data size of the candidate sub-block is small. The candidate sub-block may be propagated to all of the nodes connected to the blockchain network within a few seconds.

The candidate sub-block is an unapproved block and is not a block duly connected on the main blockchain. However, if the candidate sub-block becomes an approved sub-block under an agreement among nodes, the approved sub-block is connected on the main blockchain. Also, when the approved sub-block is connected to the main blockchain, both of a content block and an end block connected to the approved sub-block may be connected to the main blockchain. In other words, the approved sub-block chain may be connected to the main blockchain. And, this indicates that the sub-blockchain has been approved on the blockchain system.

Even if the sub-blockchain has been approved and connected to the main blockchain, according to the selection of a user who operates the node, only part of the sub-blockchain may be updated in the node's local copy of the blockchain. More specifically, the node may selectively store a specific block among a plurality of blocks comprising the sub-blockchain. For example, in the existence of an approved sub-blockchain, the user of the node may update only the sub-block on the approved sub-blockchain in the node's local copy of the blockchain. Therefore, the user of the node may selectively determine whether to store a content block by considering the storage space and needs for storing content therein.

In some embodiments, the content block may include a plurality of content blocks. For example, the content block may comprise first and second content blocks.

In the S112 step, the node may generate may generate one or more content blocks. For instance, the first content block including a hash of the end block and first content, and a second content block including a hash of the first content block. In some embodiments, the second content may be smaller than the first content in size. For example, in case the content is a video, the first content may be the video, and the second content may be text, such as the genre information of the video, producer information of the video, and actors of the video and/or information for identifying the content such as image information.

In the S113 step, the node may generate a candidate sub-block including a hash of the second content block and a hash of a main block matched to the category of the content. And, in the S114 step, the node may propagate the generated candidate sub-block to the blockchain network.

According to some embodiments, in the S112 step, the node may generate a duplicate content block including a hash of the original content block including a hash of the end block and content and a hash of the end block.

Also, in the S113 and S114 steps, the node may generate a candidate sub-block including a hash of the original content block and a hash of the duplicate content block and propagate the candidate sub-block on the blockchain network.

Figure 7:
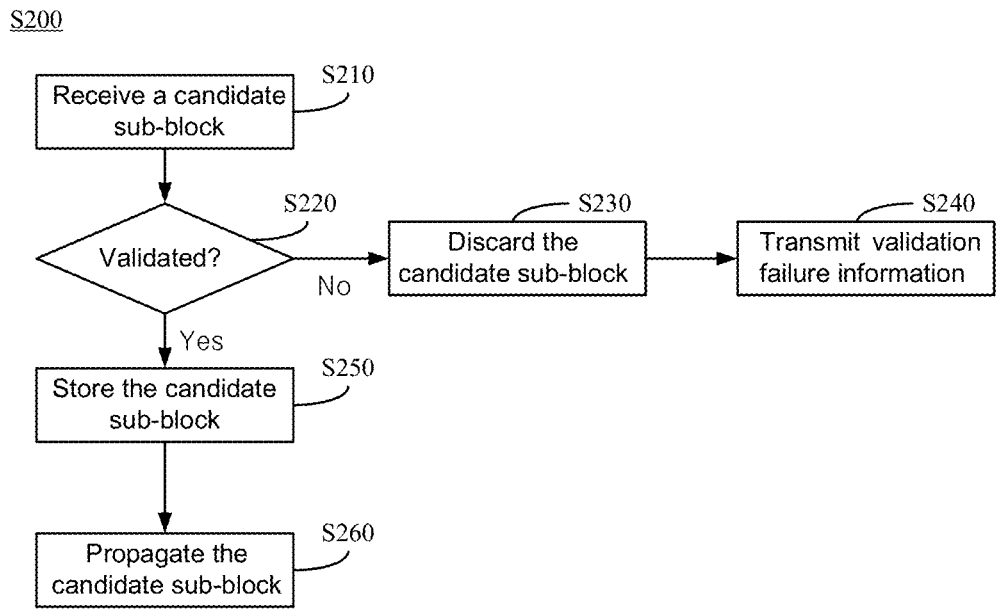
FIG. 7 is a flow diagram illustrating a process for verifying and propagating a received candidate sub-block according to an embodiment of the present disclosure.

FIG. 7 is a flow diagram illustrating a process for verifying and propagating a received candidate sub-block according to an embodiment of the present disclosure.

Referring to FIG. 7, a method or steps S200 for validating and propagating a received candidate sub-block are described. An arbitrary node among those nodes participating in the network may receive a candidate sub-block generated by another node (S210).

The node may check validity of the received candidate sub-block (S220). More specifically, the node may check well-matchedness between content information included in the candidate sub-block and the category item of the main block to which the candidate sub-block is connected. Also, the node may check whether the candidate sub-block is an approved block which has already been approved. Also, the node may check whether a block which is the same as the candidate sub-block has been received before. Also, the node may check validity of the candidate sub-block based on a predetermined criteria or checklist including, for example, a process for checking whether syntax and data structure of information included in a block are properly used and a process for checking whether size of the information included is smaller than a preconfigured threshold.

If the received candidate sub-block and the main block are not matched, or if the received candidate sub-block is an already approved block or a candidate sub-block received repeatedly, or if the received candidate sub-block does not satisfy the remaining conditions on the predetermined criteria or checklist, the node may determine that validation of the received candidate sub-block has failed. The node may discard the candidate sub-block which has failed the validation (S230) and transmit validation failure information to the node which has generated the candidate sub-block (S240).

However, if the validation of the received candidate sub-block is completed or satisfied, the node may store the corresponding candidate sub-block (S250) and propagate the corresponding candidate sub-block on the blockchain network (S260).

The node stores a validated candidate sub-block in a database. Through the process described above, different candidate sub-blocks may be piled up on the database. In response to the request from the user, the node may search the stored candidate sub-blocks for a candidate sub-block matching the user's request.

Figure 8:
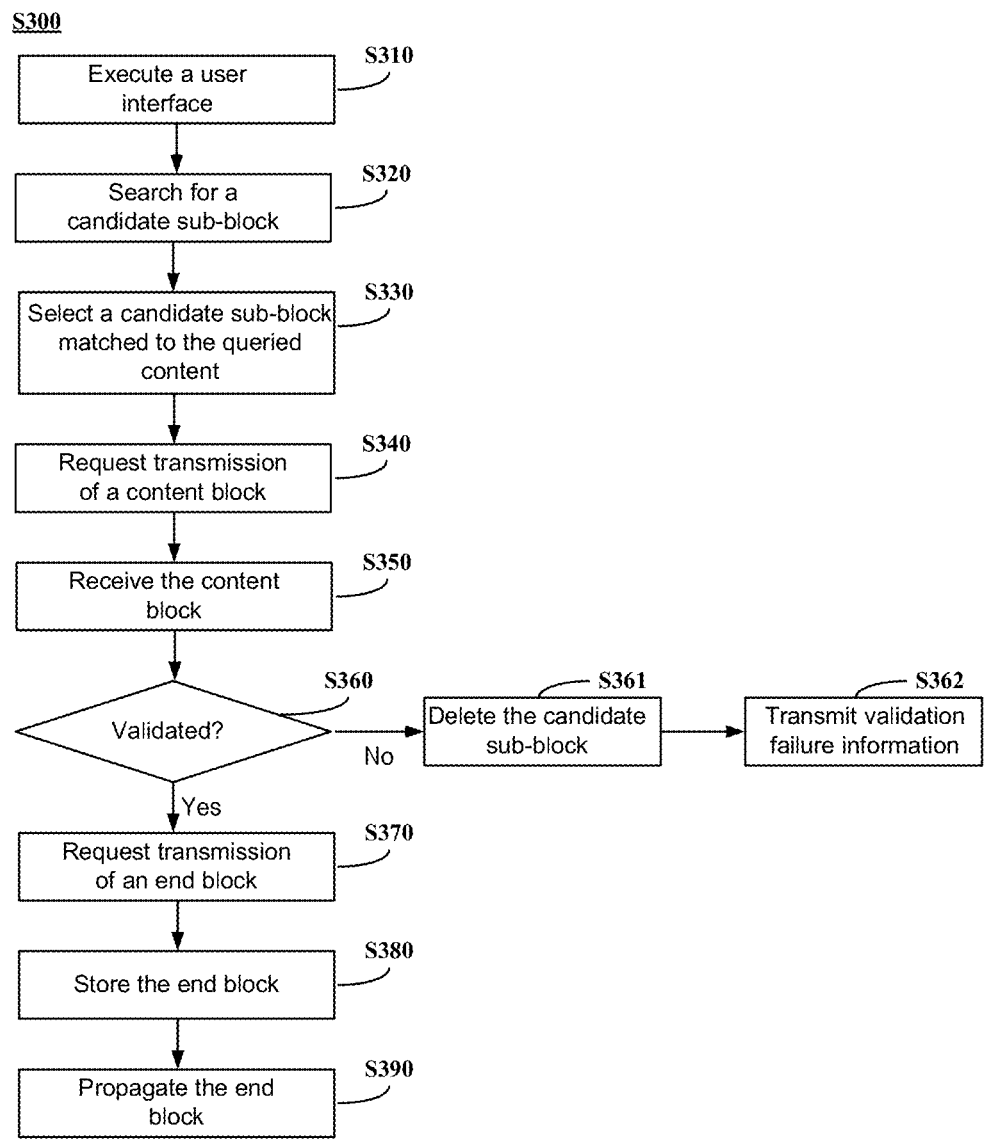
FIG. 8 is a flow diagram illustrating a method for receiving a content block connected to a selected candidate sub-block and propagating an end block according to an embodiment of the present disclosure.
Figure 9:
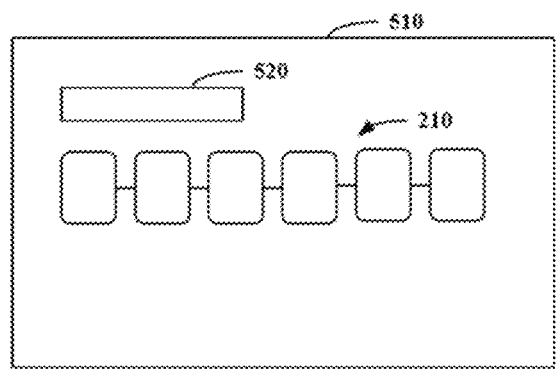
FIGS. 9 and 10 illustrate user interfaces for blockchain search according to embodiments of the present disclosure.
Figure 10:
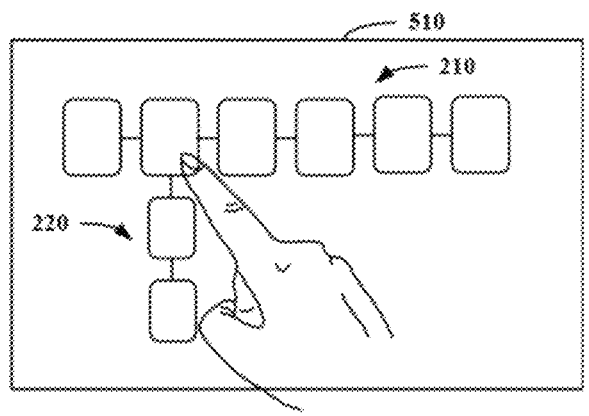

FIG. 8 is a flow diagram illustrating a method for receiving a content block connected to a selected candidate sub-block and propagating an end block according to an embodiment of the present disclosure, and FIGS. 9 and 10 illustrate user interfaces for blockchain search according to an embodiment of the present disclosure.

Referring to FIG. 8, a method or steps S300 for receiving a content block connected to a candidate sub-block and propagating an end block may include executing or providing a user interface for blockchain search in response to a user's request (S310), searching for a stored candidate sub-block in response to the user's request or query (S320), selecting a candidate sub-block matching or corresponding to content requested by the user (S330), requesting transmission of a content block to a node which has generated the selected candidate sub-block (S340), receiving the content block (S350), checking validity of the received content block (S360), requesting transmission of an end block if the content block is validated (S370), storing a received end block (S380), and propagating the end block (S390).

In an embodiment of the present disclosure, referring to FIGS. 8 and 9, a node may execute and display a user interface 510 for blockchain search in response to the user's request (S310). A main blockchain 210 stored in the node may be displayed on the user interface 510. Also, category information of each of the main blocks on the main blockchain 210 may be displayed together on the user interface 510.

The user may enter a search term into a search input window 520 on the user interface 510. The node may search candidate sub-blocks stored in the database for a candidate sub-block matching or corresponding to the input search term (S320). One or more candidate sub-blocks matching or corresponding to the search keyword or search term provided or entered by the user as a query is displayed, and the user may select one of the displayed candidate sub-blocks (S330).

In another embodiment of the present disclosure, referring to FIGS. 8 and 10, the node may execute and display the user interface for the blockchain search 510 in response to the user's request (S310). The main blockchain 210 may be displayed on the user interface 510. The node may display candidate sub-blocks connected to the main block selected from among candidate sub-blocks stored in the database of the node in response to the user's selection of one of the plurality of main blocks on the main blockchain 210. For example, the node may display both of an approved sub-block and a candidate sub-block stored in the database of the node in response to the user's selection of one of the plurality of main blocks on the main blockchain 210. Also, the node may display a sub-block together with an indication about whether the displayed sub-block is an approved sub-block. Therefore, the user may check reliability of the display sub-block. This may provide a convenience for the user in selecting a reliable sub-block of content among a plurality of sub-blocks.

Also, the user may select one candidate sub-block among candidate sub-blocks displayed (S330).

The node may request another node, which has generated the selected candidate sub-block, to transmit a content block connected to the selected candidate sub-block in response to the user's selection of the candidate sub-block (S340).

The node receives the content block from another node (S350), and the node may display content contained in the content block. And, the node may check validity of the content block (S360).

Now, validation of a content block will be described in more detail.

If display of the content is completed, the node may determine that validation of the content block has been completed. For example, in case the content is a movie, if play of the movie is fully completed, it may be determined that validation of the content block has been completed. In some embodiments, the node may complete validation of the content block in response to reception of the user's approval information. For example, the node may not only display the content but also execute a user interface for validation to check whether the content has been validated. The user may enter information about or related to validity of the corresponding content on the executed user interface for validation. In response to reception of input information from the user indicating that the content is valid, the node may determine that the content block has been validated. In certain embodiments, the node may execute a user interface for payment before displaying content included in the content block. The user may perform the payment procedure for playing content through the user interface for payment. The node may retrieve payment information included in the content block or the candidate sub-block connected to the content block and a blockchain address of a node which has generated the content block. And the retrieved information may be displayed through the user interface for payment. The user may proceed with the payment of an amount displayed on the user interface for payment. After the payment is completed, the node may execute the content included in the content block. Also, in response to the completion of the payment, the node may determine that the content block has been validated.

In some embodiments of the present disclosure, the node searches for a pre-stored sub-block, checks information of another node which has generated the sub-block included in the searched sub-block, requests a content block from the corresponding node, and thereby displays content to the user. Therefore, even if a large-sized content block is not stored in advance, the node may receive a content block by using a pre-stored sub-block and display content included in the content block.

In some embodiments, the content block may be composed of a plurality of content blocks.

Among the plurality of content blocks, the last content block connected to an end block may include content that the user actually wants to retrieve, and the remaining content blocks except for the last content block may include various pieces of information for identifying content included in the last content block.

For example, if the content block comprises a first content block connected to a candidate sub-block and a second content block connected to the first content block and the end block, the content included in the first content block may correspond to the information for identifying the content included in the second content block, which may be, for example, but not limited to, a description, a summary, or other information.

The node which has generated a candidate sub-block may transmit the first content block connected to the candidate sub-block first in response to the transmission request of the content block.

The node which has received the first content block may check validity of the first content block. For example, based on a checklist or criteria prepared in advance, the validity of the first content block may be checked. In some embodiments, a node may execute a user interface for validation and if an input signal for validation confirmation is received from a user, may determine that the first content block is valid. If the validity of the first content block is confirmed, the node may request another node which has generated a candidate block to transmit the second content block connected subsequently to the first content block. As described above, if a content block is composed of a plurality of content blocks, the node may receive the content block sequentially. And, an operation for receiving the next content block may be executed under a condition that the validity of a previous content block is satisfied. Also, if payment is required before content included in the content block is displayed, the payment may be requested only when the content within the last content block is displayed.

According to an embodiment of the present disclosure, a content block may be composed of a plurality of content blocks, and only the last content block includes content with a relatively large size comparing with other content blocks. Therefore, the node receives the forefront content block with a relatively small size and checks validity of the corresponding content block (for example, checks in advance which content is included in the last content block by checking identification information of the content), after which the node receives a subsequent content block. Therefore, the user may prevent a problem of receiving undesired content having a large size by checking the identification information of the content within the forefront content blocks in advance.

Also, according to another embodiment of the present disclosure, each of a plurality of content blocks may include content segments. Therefore, the user may receive a plurality of content blocks sequentially in the form of streaming and retrieve the content within the received content blocks. Also, payment may be proceeded for each of a plurality of content blocks so that billing may be processed according to sequential viewing of the content. Also, only at least part of the plurality of content blocks may be stored in the database. Therefore, only a part of the whole content needed by the user may be stored.

In some embodiments, the content block may include an original content block and a duplicate content block. The original content block may include content. The duplicate content block may embed a script for requesting a node which has generated a candidate sub-block to transmit the original content block. Alternatively, the duplicate content block may include link information for a storage in which the original content is stored.

The node may delete only the original content block received. As the original content block is deleted, a burden on the storage capacity of the node may be reduced. Also, a chain connection between the end block and the sub-block may be maintained through the duplicate content block. Also, depending on the needs, the original content block may be requested by using the script or the link included in the duplicate content block.

If validity is not confirmed after validation of the content block at S360, the node may delete the candidate sub-block connected to the corresponding content block (S361) and transmit information related to validation failure of the content block to the node which has generated the candidate sub-block (S362).

If the validation of the content block is completed at S360, the node may request another node which has generated the candidate sub-block to transmit the end block (S370). The node may store the end block received from another node (S380) and propagate the end block on the blockchain network (S390).

In certain embodiments, if a content block is composed of a plural number of content blocks, the content blocks are dependently connected to each other, the forefront content block is connected to a candidate sub-block, and the last content block is connected to the end block. And, the node validates each of the plurality of content blocks sequentially. If the last content block is validated, the node requests another node which has generated the candidate sub-block to transmit the end block.

Meanwhile, after viewing the content, the user may delete the content block including the corresponding content.

The node may remove the content block containing content in response to reception of a request to remove the content from an user. In some embodiments, in case the content block is composed of a plurality of content blocks, only the last content block may be removed. In certain embodiments, in case the content block contains an original content block and a duplicate content block, only the original content block may be removed.

Figure 11:
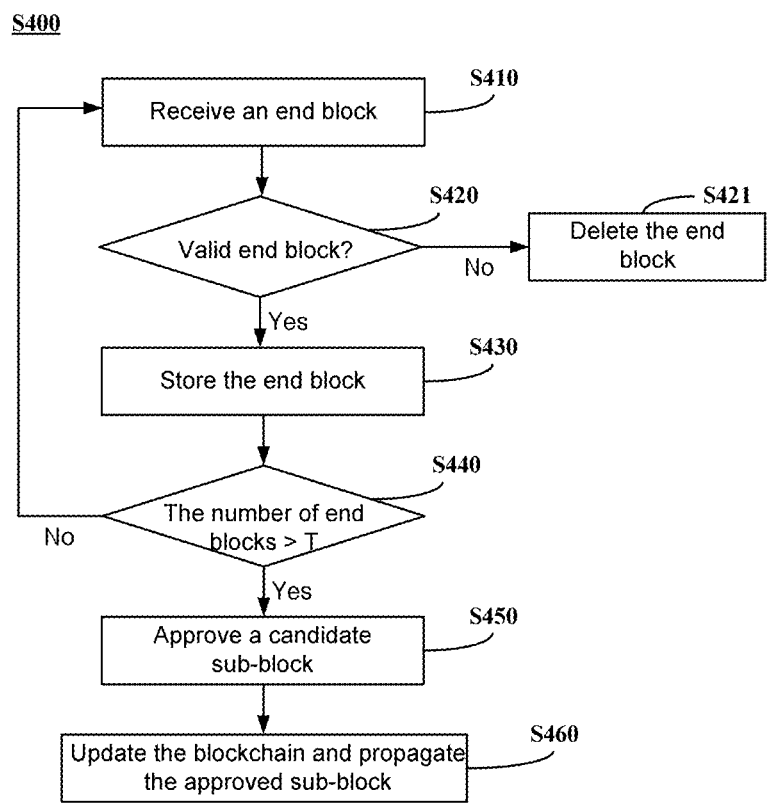
FIG. 11 is a flow diagram illustrating a process for approving a candidate sub-block according to an embodiment of the present disclosure.

FIG. 11 is a flow diagram illustrating a process for approving a candidate sub-block according to an embodiment of the present disclosure.

A method or steps S400 for approving a candidate sub-block will be described with reference to FIG. 11.

An arbitrary node among those nodes participating in the network may receive an end block transmitted by another node (S410).

The node may check validity of the end block received at S410 (S420). The node may delete the end block if the candidate sub-block connected to the end block is a sub-block already approved.

If the validity of the end block is confirmed at S420, the node may store the end block (S430).

The node may determine whether the total number of the same end blocks stored in the node exceeds a preconfigured number T (S440). If the total number of the same end blocks stored in the node exceeds the preconfigured number T, the node may approve a candidate sub-block connected to the corresponding end block (S450). In other words, the end block is propagated on the network after the content block is validated. Therefore, it may be regarded that as the number of the same end blocks stored in the node is increased, the number of retrieval of content blocks related to the end block is increased. This may indicate that reliability of the content is improved. The candidate sub-block may be approved as a formal sub-block only when the reliability of the content reaches a preconfigured level.

The node may update the approved sub-block on the blockchain stored on the database to connect the sub-block to a main block. And the node may propagate the approved sub-block on the blockchain network (S460).

Figure 12:
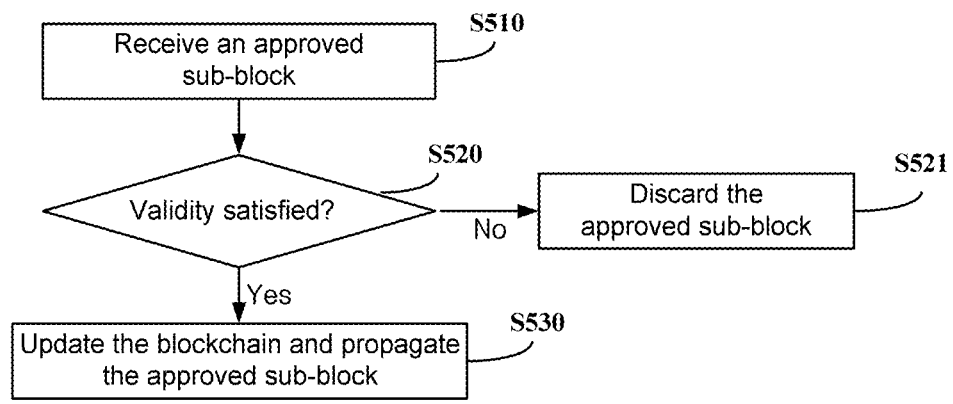
FIG. 12 is a flow diagram illustrating an operating process of a node according to reception of an approved sub-block according to an embodiment of the present disclosure.

FIG. 12 is a flow diagram illustrating an operating process of a node according to reception of an approved sub-block according to an embodiment of the present disclosure.

An operating process or steps S500 of a node according to reception of an approved sub-block will be described with reference to FIG. 12.

An arbitrary node among a plurality of nodes participating in the network may receive an approved sub-block (S510). If the node receives the approved sub-block, validity of the received approved sub-block may be checked (S520). In case the received approved sub-block has already been updated on its own blockchain, the received approved sub-block may be discarded (S521). If validity of the received approved sub-block is confirmed at S520, the node may update the blockchain and propagate the approved sub-block on the blockchain network (S530).

Figure 13:
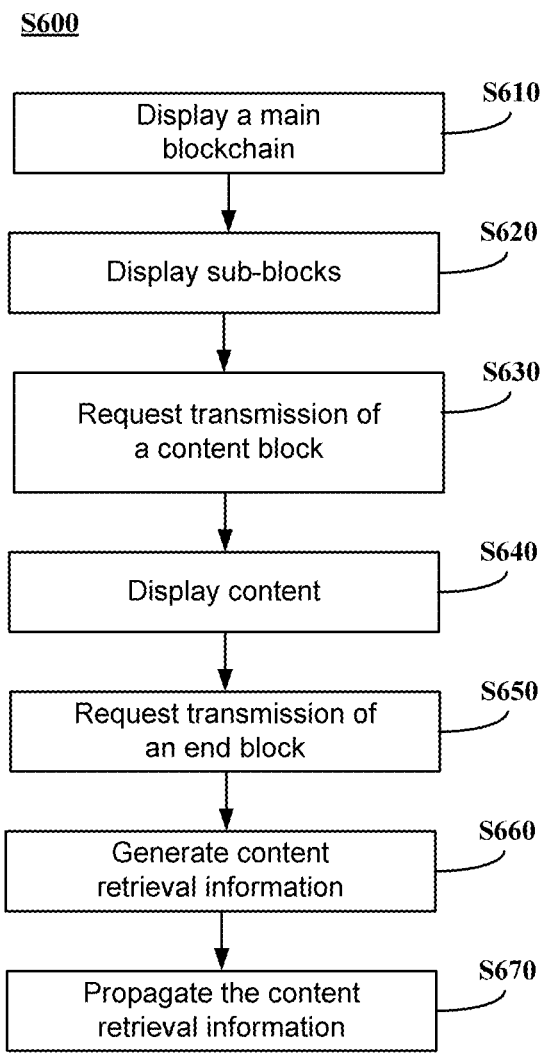
FIG. 13 is a flow diagram of a method for displaying reliability information of content according to an embodiment of the present disclosure.

FIG. 13 is a flow diagram of a method for displaying reliability information of content according to an embodiment of the present disclosure.

A method or steps S600 for displaying reliability information of content according to an embodiment of the present disclosure will be described with reference to FIG. 13.

An arbitrary node may execute or perform a user interface for search in response to the user's request and display a main blockchain including information about a plurality of categories and main blocks being dependently connected to each other (S610).

In response to the user's selection of one main block on the main blockchain received through the user interface, the node may display sub-blocks of each of at least one of sub-blockchains connected to the main block (S620). At S620, the sub-blocks displayed may be approved sub-blocks or unapproved sub-blocks and whether the sub-blocks have been approved may be indicated distinctively or separately.

In response to the user's selection of one of sub-blocks, the node may request transmission of one or a plurality of content blocks to a content storage node storing the plurality of content blocks dependently connected to the sub-block (S630).

Alternatively, in response to the user's selection of one of sub-blocks, the node may request transmission of a duplicate content block to the content storage node storing the duplicate content block dependently connected to the sub-block.

And, through execution of a script included in the duplicate content block, the node may receive an original content block. Similarly, through a link included in the duplicate content block, the node may receive the original content block.

The node may display content contained in the received content block (S640).

In another aspect, the node may display content contained within the received original content block.

If receiving one content block from the content storage node storing a plurality of content blocks, the node validates the received content block. And the node may request the content storage node to transmit another content block connected subsequently to the content block for which validation has been completed. For example, in case the content block is composed of a plurality of content blocks, after completing validation of a preceding content block, the node may request the content storage node to transmit a content block subsequent to the preceding content block. In yet another aspect, after completing validation of the content block, the node may request the content storage node to transmit an end block subsequent to the corresponding content block.

In still another aspect, the node may check validity of a duplicate content block. If the validity of the duplicate content block is confirmed, the node may receive the original content block.

In response to the content contained in the last content block of the plurality of content blocks being displayed on the node, the node may request the content storage node to transmit the end block connected to the last content block (S650).

Alternatively, in response to the content contained in the original content block being displayed on the node, the node may request the content storage node to transmit the end node.

The node may generate content retrieval information in response to reception of the end block (S660). At this time, only when the content contained in the content block connected to an already approved sub-block is retrieved, the content retrieval information may be generated.

The node may propagate the content retrieval information over the blockchain network (S670).

An arbitrary node may receive and store content retrieval information received from the blockchain network. And, based on the number of retrieval information about the same content stored, the node may generate content reliability information. And, the node may display the content reliability information when the received content block is displayed or before content contained in the received content block is displayed or when content contained in the received content block is displayed.

Some embodiments of the present disclosure described above may be implemented in the form of program commands which may be executed through various types of computer means and recorded in a computer-readable recording medium. The computer-readable recording medium may include program commands, data files, and data structures separately or in combination thereof. The program commands recorded in the computer-readable recording medium may be those designed and composed specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be composed to be operated by one or more software modules to perform the operations of the present disclosure, and vice versa.

Specific implementation of the present disclosure are embodiments, which does not limit the technical scope of the present disclosure in any way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of this document but has to be defined by the appended claims.

Some embodiments of the present disclosure may provide a blockchain system capable of overcoming a limitation to the size of data to be included on a blockchain.

Also, certain embodiments of the present disclosure may provide an algorithm for achieving an agreement to guarantee reliability of a sub-blockchain carrying content.

Also, some embodiments of the present disclosure may check a reliability level or whether an agreement has been reached with respect to content reliability before retrieving large-sized content.

Additionally, certain embodiments of the present disclosure may provide a blockchain-based content sharing system capable of sharing, selling, and purchasing content.

Further, according to some embodiments of the present disclosure, a blockchain system may provide the content of which may be retrieved in the form of streaming.

Also, certain embodiments of the present disclosure may allow selective synchronization of a content block including content, thereby reducing storage resources or a burden of storage capacity.

The technical effects of the present disclosure are not limited to the technical effects described above, and other technical effects not mentioned herein may be understood from the description above.

What is claimed is:

1. A method for constructing a sub-blockchain in a blockchain system comprising a distributed network of a plurality of nodes, the method comprising:
   generating and propagating, by one node of the plurality of nodes, a candidate sub-block for a sub-blockchain to be connected to one of a plurality of main blocks included in a main blockchain;

validating, by another node of the plurality of nodes, the candidate sub-block generated by the one node and storing and propagating the validated candidate sub-block;

validating, by the another node, a content block received from the one node which has generated the candidate sub-block corresponding to content requested by a user and storing and propagating, by the another node, an end block connected to the content block; and when the number of same end blocks stored in the another node and including the end node is larger than a preconfigured value, generating, by the another node, an approved sub-block by approving the candidate sub-block connected to the end block, propagating, by the another node, the approved sub-block, and adding the approved sub-block to a local copy of a blockchain.

2. The method of claim 1, further comprising:

approving the sub-blockchain comprising the content block connected to the approved sub-block and the end block connected to the content block; and connecting the approved sub-blockchain to the main blockchain.

3. The method of claim 1, wherein the another node selectively stores only a specific block of a plurality of blocks comprising an approved sub-blockchain.

4. The method of claim 1, wherein each of the plurality of main blocks includes item information for each predetermined category, and content included in the sub-blockchain corresponds to item information for each category of a main block connected to the sub-blockchain.

5. The method of claim 1, wherein the sub-blockchain is connected to another sub-blockchain connected to one of the plurality of main blocks included in the main blockchain.

6. The method of claim 1, wherein the generating and propagating the candidate sub-block includes:

generating the end block;

generating the content block including a hash of the end block and the content of the end block;

generating the candidate sub-block including a hash of the content block and a hash of a main block corresponding to a category of the content; and propagating the candidate sub-block to the distributed network.

7. The method of claim 6, wherein the generating the content block including the hash of the end block and the content of the end block includes:

generating a plurality of content blocks being connected to each other and including hashes of subsequent content blocks connected to the plurality of content blocks, wherein a last content block of the plurality of content blocks includes a hash of the end block; and generating a candidate sub-block including a hash of a forefront content block of the plurality of content blocks and the hash of the main block corresponding to the category of the content.

8. The method of claim 7, wherein the last content block includes the content, and remaining content blocks among the plurality of content blocks include information of summary of the content.

9. The method of claim 7, wherein each of the plurality of content blocks includes a content segment obtained by dividing the content into a plurality of content segments.

10. The method of claim 7, wherein the validating the content block received from the one node which has generated the candidate sub-block corresponding to the content requested by the user and storing and propagating the end block connected to the content block includes:

receiving information related to the content to be retrieved from the user;

searching a sub-block corresponding to the received information related to the content from stored candidate sub-blocks;

requesting a node which has generated the searched sub-block to transmit a plurality of content blocks connected to the searched sub-block and validating the transmitted content blocks; and when validation of a last content block of the transmitted content blocks is completed, receiving the end block and storing the end block into the node which has generated the searched sub-block and propagating the end block to the distributed network.

11. The method of claim 6, wherein the generating the content block including the hash of the end block and the content of the end block includes:

generating the end block;

generating a original content block including the hash of the end block, the content of the end block, and a duplicate content block including the hash of the end block;

generating a candidate sub-block including the hashes of the original and duplicate content blocks and the hash of the main block corresponding to the category of the content; and propagating the candidate sub-block to the distributed network.

12. The method of claim 11, wherein the duplicate content block includes a script for requesting transmission of the original content block, or information of a link associated with a storage in which the original content block including the content is stored.

13. The method of claim 1, wherein the validating the content block received from the one node which has generated the candidate sub-block corresponding to the content requested by the user and storing and propagating the end block connected to the content block includes:

receiving information related to the content to be retrieved from the user;

searching a sub-block corresponding to the received information related to the content from stored candidate sub-blocks;

requesting a node which has generated the searched sub-block to transmit a content block connected to the searched sub-block;

validating the transmitted content block; and receiving the end block and storing the end block into the node which has generated the searched sub-block connected to the validated content block and propagating the end block to the distributed network.

14. A non-transitory computer-readable medium recording a computer program including commands executable by at least one processor of at least one node of a blockchain system comprising a distributed network of a plurality of nodes, wherein the commands that, when executed by the at least one processor, cause the at least one processor to:

display a main blockchain comprising main blocks, connected to each other and include a plurality of individual pieces of category information in response to a user request;

display sub-blocks of at least one sub-blockchain connected to one main block of the main blocks in response to selection of the one main block comprised in the main blockchain;

request a content storage node to transmit a plurality of content blocks in response to selection of one of the sub-blocks, the content storage node storing the plurality of content blocks connected to the sub-block; and display content included in a received content block included in the plurality of content blocks transmitted from the content storage node.

15. The medium of claim 14, wherein the commands cause the at least one processor to, after validation of the received content block among the plurality of content blocks is completed, request transmission of a content block connected subsequently to the received content block.

16. The medium of claim 15, wherein the commands cause the at least one processor to, if the displaying of the content included in the received content block is completed, determine the validation of the received content block as being completed.

17. The medium of claim 16, wherein the commands cause the at least one processor to:
when validation of the plurality of content blocks is completed, receive an end block connected to a last content node of the plurality of content nodes from the content storage node, and
propagate the received end block to another node.

18. The medium of claim 15, wherein the commands cause the at least one processor to, in response to receiving information about validity of the displayed content, determine validation of the displayed content as being completed.

19. The medium of claim 15, wherein the plurality of content nodes are connected to each other, and remaining content nodes except for the last content node among the plurality of content nodes include information of summary of content included in the last content node.

20. The medium of claim 15, wherein, the plurality of nodes share information about the number of retrievals of the content included in the content blocks, and when the sub-blocks are displayed, reliability information of content computed based on the information about the number of retrievals of the content is displayed.

* * * * *